March 18, 1952 — D. H. PUTNEY — 2,589,862
METHOD AND APPARATUS FOR CONTACTING GASES AND PULVERIZED SOLIDS
Filed Dec. 22, 1945 — 4 Sheets-Sheet 1

March 18, 1952 — D. H. PUTNEY — 2,589,862
METHOD AND APPARATUS FOR CONTACTING GASES AND PULVERIZED SOLIDS
Filed Dec. 22, 1945 — 4 Sheets-Sheet 4

Inventor
David H. Putney

Patented Mar. 18, 1952

2,589,862

UNITED STATES PATENT OFFICE 2,589,862

METHOD AND APPARATUS FOR CONTACTING GASES AND PULVERIZED SOLIDS

David H. Putney, Kansas City, Mo., assignor to Stratford Engineering Corporation, Kansas City, Mo., a corporation of Delaware Application December 22, 1945, Serial No. 636,756

7 Claims. (Cl. 23—1)

1

This invention relates to improvements in a method and apparatus for contacting gases and pulverized solids and refers more particularly to the contacting of hydrocarbon vapors and gases with a solid pulverized catalyst in a fluid-type catalytic process.

The salient novelty resides in the method and apparatus for contacting the gaseous material and catalyst by passing these constituents generally in counterflow relationship through a vessel while mechanically moving the mixture of gases and catalyst in a plurality of local cyclic circumfluent eddies. In other words, while the catalyst is passed counterflow through the vessel with the gases there is set up within the vessel by mechanical energy a plurality of local circulations or eddies of the mixture to effect a more thorough and intimate mixture.

An object of the invention, therefore, is to provide a method for more intimately combining the gaseous materials with the catalyst.

Another object is to apply this principle to a stripper wherein the used catalyst is denuded of its hydrocarbon content.

Another object is to provide an improved type of stripper which may be applied to conventional catalytic apparatus now erected and being operated which will improve their yield and increase the effectiveness of regenerating the catalyst.

A further object is to utilize the principle not only in the stripper stage but in the reactor and regenerating stages.

Other and further objects of the invention will appear from the following description.

Figure 1:
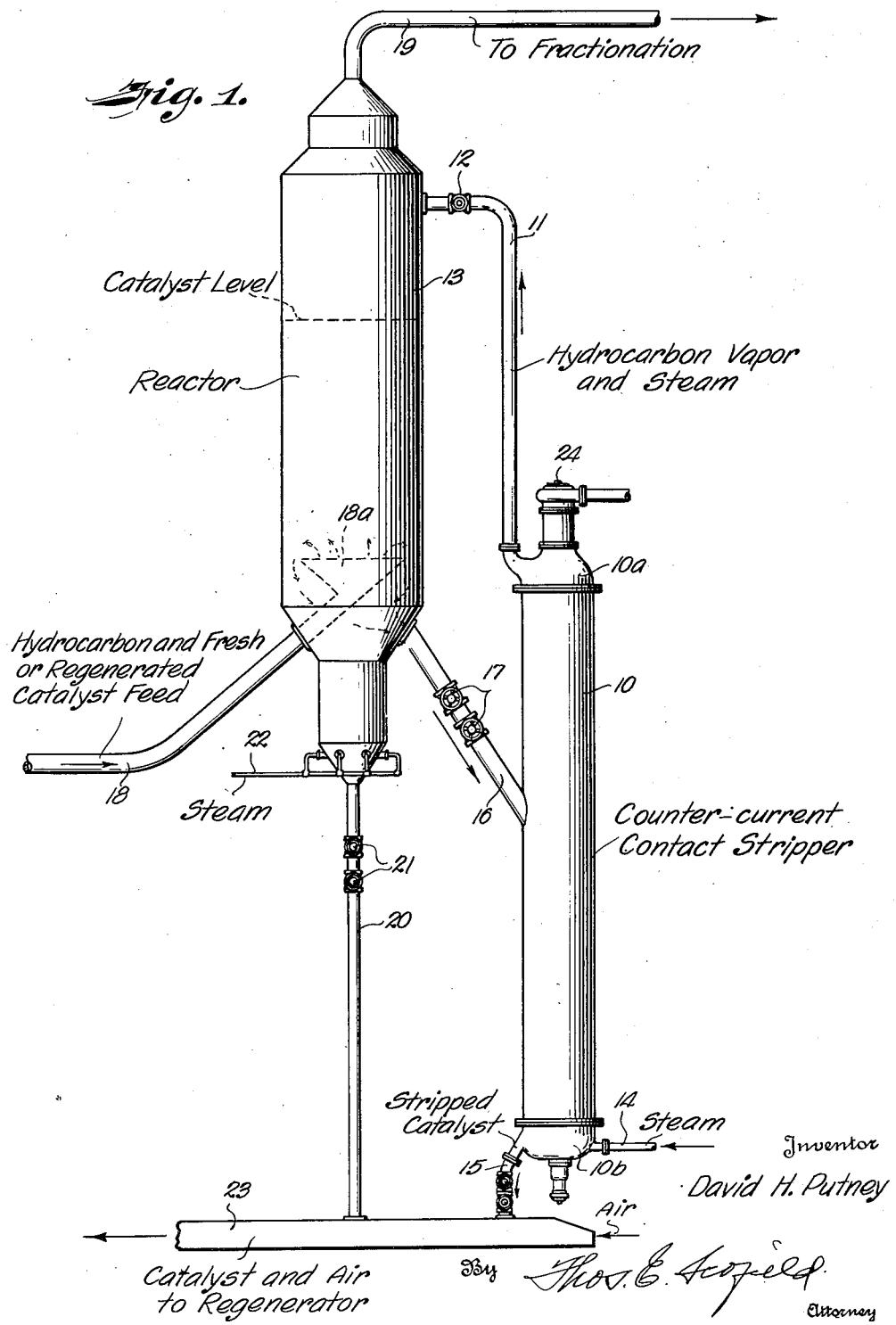
Figure 2:
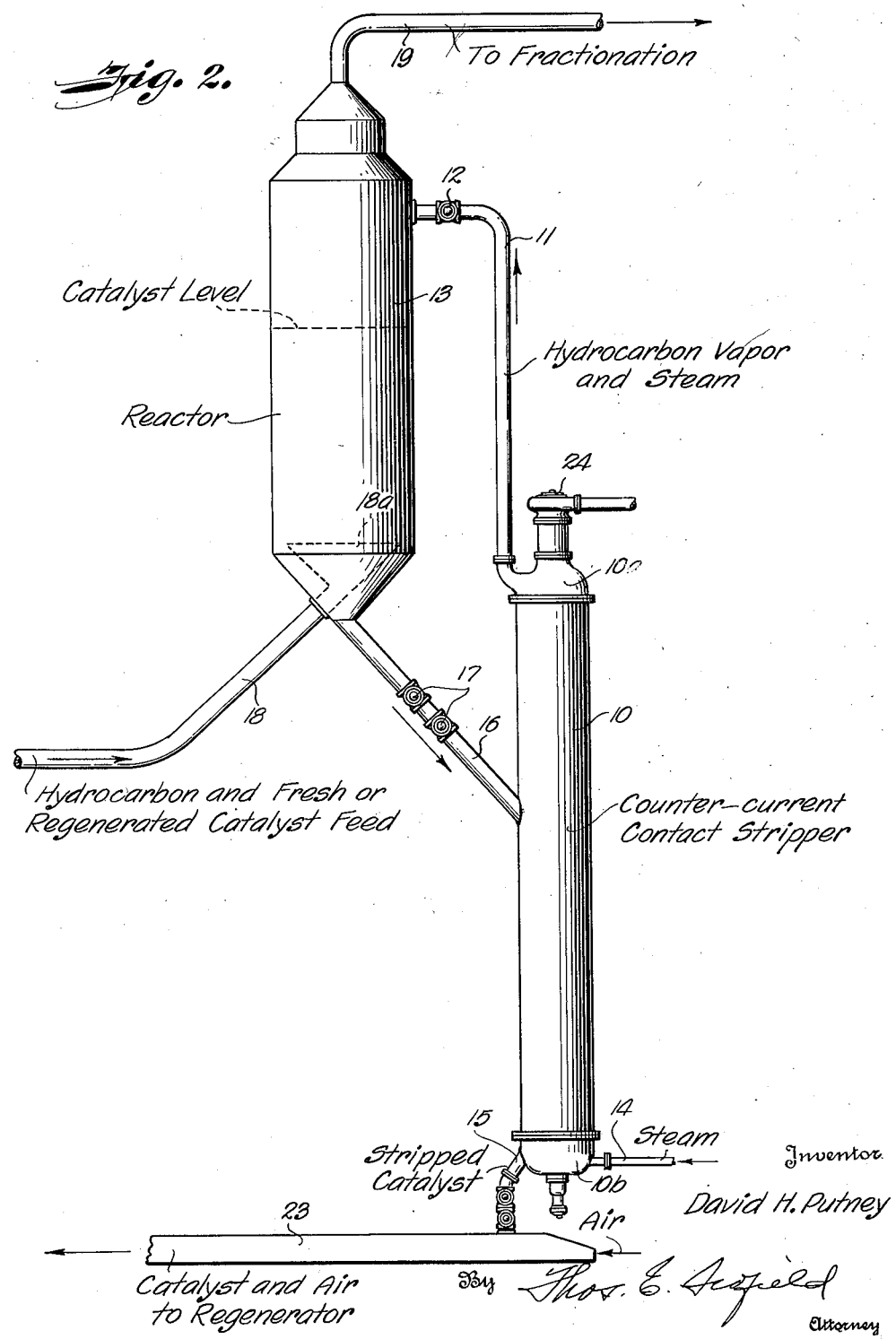
Figure 3:
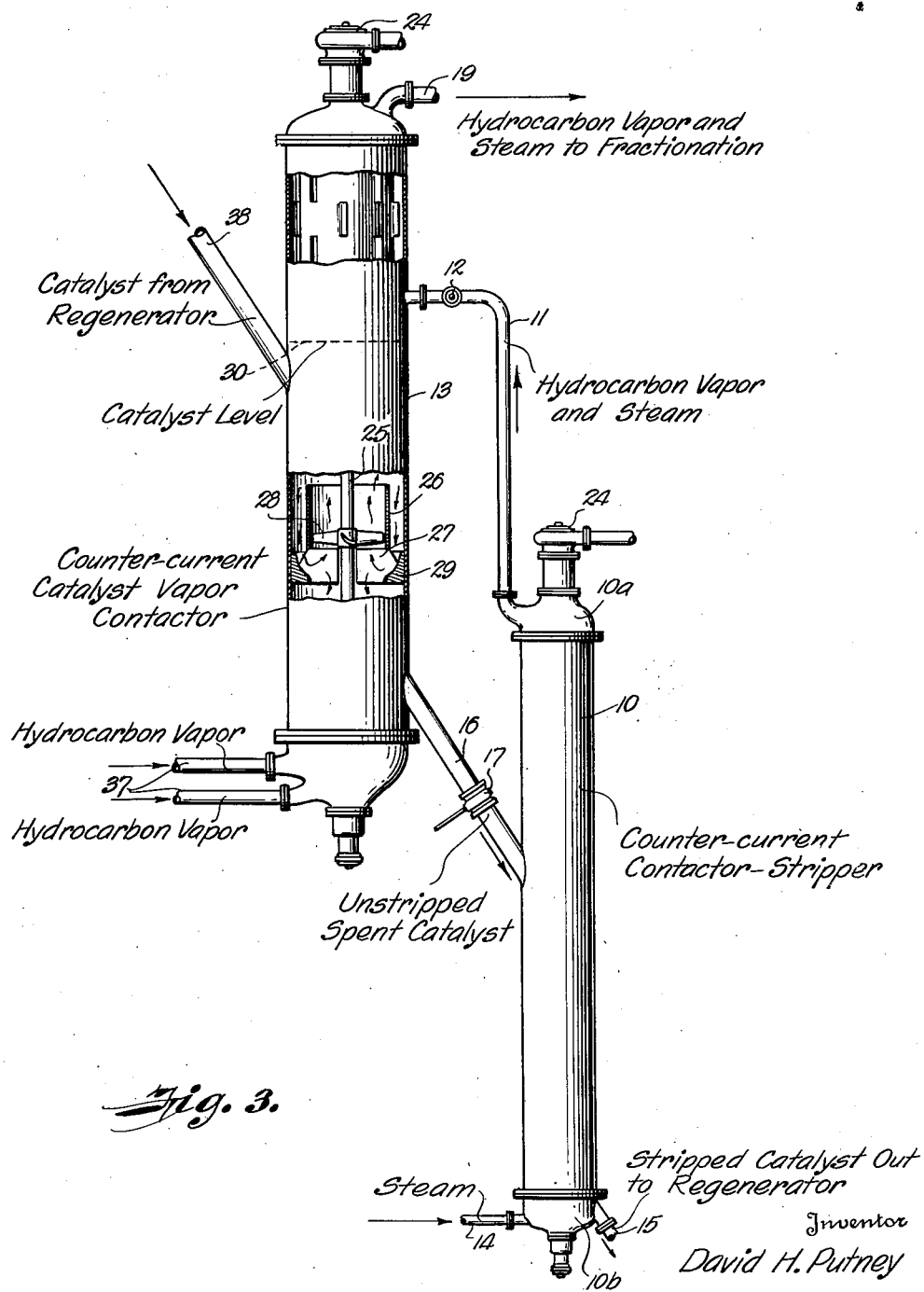
Figures 4, 5, 6:
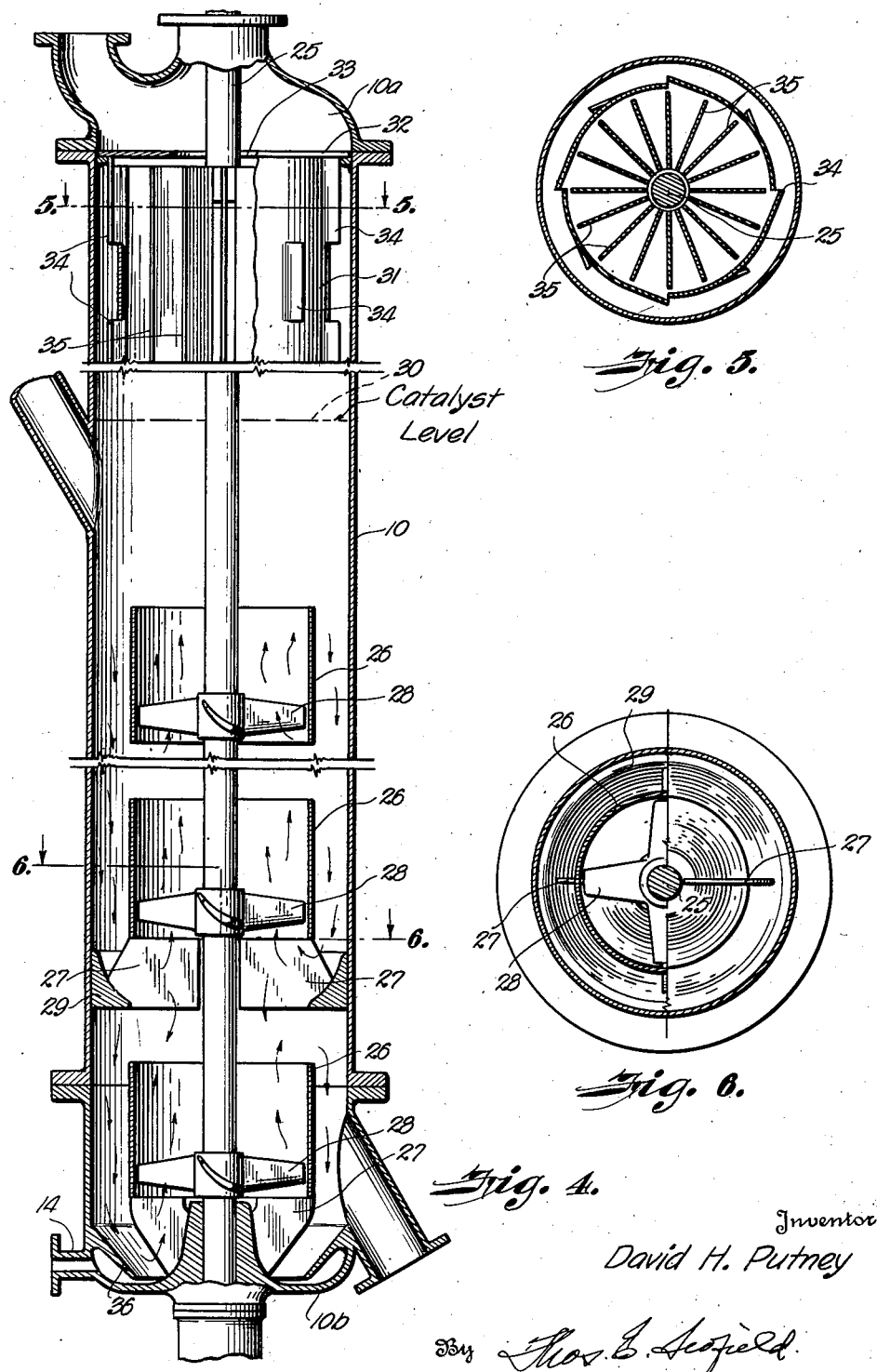

In the accompanying drawings which form a part of the specification and are to be read in conjunction therewith and in which like reference numerals indicate like parts in the various views, Fig. 1 is an elevational view of the apparatus applied to a conventional fluid type cracking reactor, Fig. 2 is a modified application of the apparatus to a conventional reactor, Fig. 3 is a similar view showing the stripper applied to a reactor in which the principles of circulation are employed in the reactor as well as the stripper, Fig. 4 is an enlarged sectional view of the apparatus, Fig. 5 is a view taken along the line 5—5 in Fig. 4 in the direction of the arrows, and Fig. 6 is a view taken along the line 6—6 in Fig. 4 in the direction of the arrows.

In the so-called fluid-type catalytic processes flow of the gaseous materials is either by bubbling or percolating vapors through a stationary bed of catalyst or by carrying the catalyst in suspension in the gaseous material in concurrent flow. It has been suggested that a cyclic flow may be maintained by setting up a movement of the mixture of gases and catalyst around an open-ended flow tube positioned within a closed vessel by means of propellers or circulators positioned within the flow tube. The flow of reactant gases and pulverized catalyst in each of these cases is concurrent from the bottom of the contactor to the top. The instant invention proposes a series or plurality of zones or stages within the contacting vessel by making the circulation tube within the contactor discontinuous or in short lengths instead of a continuous tube and providing stationary or rotating baffles between the segments of the tube for the purpose of interrupting the flow. Within each tube section a cyclic flow will be established by means of an impeller or a plurality of propellers mounted upon a central shaft. A catalyst level will be maintained above the top of the uppermost circulation tube and catalyst which is introduced at the top of the vessel or contactor can only flow from stage to stage in an amount equal to the catalyst withdrawn from the lowest stage. Thus, it will be seen that although the catalyst and vapor flow within each of the stages is concurrent, the overall effect of operating these multistage eddies is that of countercurrent flow since catalyst is introduced at the top to be withdrawn at the bottom and all of the gaseous material is introduced at the bottom and leaves from the top.

The apparatus is particularly adapted to the stripping of hydrocarbon vapors from the pulverized catalyst leaving the reactor of a fluid-type catalytic cracking unit. Countercurrent flow is a fundamental requirement of all stripping operations and in this case all of the steam introduced in the lower portion of the stripper is thoroughly and intimately mixed with the catalyst in each of the eddy stagtes picking up and carrying with it from the catalyst particles an increasing amount of hydrocarbon vapor as it passes from stage to stage. The catalyst entering from above into the uppermost stage contains the maximum amount of hydrocarbon both within its voids and adsorbed on its surfaces. As the catalyst progresses downward from stage to stage the hydrocarbon vapors are displaced from the voids of the catalyst by the steam and the increasing amounts of steam which enter the voids tend to lower the partial pressure of the hydrocarbon vapors to the extent hydrocarbons adsorbed by the catalyst are in turn released as vapor in which state they can be more easily displaced by the stripping steam.

The method and apparatus may also be used to good advantage in the reacting stage of a fluid catalytic cracker. In this application, as shown in Fig. 3, the hydrocarbon vapor flow will be in an upward direction through the reactor while the catalyst is introduced at the top and is withdrawn at the bottom. The hydrocarbon vapors will first contact catalyst near the bottom which is most nearly spent and thus fractions of the vapor which are most easily converted will, therefore, be reacted in the lower portion of the reactor. As the hydrocarbon vapors rise they will contact catalyst which is more active and by the time the vapors reach the uppermost stage of the reactor it will meet the fresh or regenerated catalyst which is most effective in promoting conversion of the refractory hydrocarbons.

The method and apparatus has application to good advantage in the regenerator where spent catalyst is subjected to high temperature and the carbon deposit burned from the catalyst. The overall effect of countercurrent flow of the catalyst and regenerated gas or air causes a more complete regeneration and restoration of activity for any given quantity of regenerating gas or air. It is recognized that the more nearly a catalyst is regenerated the more difficult is the succeeding increment of regeneration. By employing this type of countercurrent flow in the regenerator the catalyst which is most nearly regenerated first contacts and is mixed with the greatest and most concentrated quantity of regenerating medium or when burning carbon from catalyst particles the catalyst meets highly heated air or combustion gases in which the oxygen content is maximum. In the upper portion of the regenerator where the burning of the carbon is most easily promoted the regenerating gases will contain a diminished quantity of oxygen which will suppress the tendency toward overheating in this zone of otherwise normally maximum burning rate.

Referring to Figs. 1 and 2 of the drawings at 10 is shown a cylindrical shell or vessel to which is bolted by suitable flange connections a head 10a and a bottom portion 10b. Connected into the head is vapor line 11 controlled by valve 12 which communicates with the upper part of reactor 13. Into the bottom of the stripper is connected steam line 14 and a catalyst drawoff line 15. Into the side of the stripper is a diagonal catalyst supply pipe 16 controlled by valves 17 and communicating with the lower part of the reactor 13.

The reactors shown in Figs. 1 and 2 are equipped with a feed pipe 18 through which hydrocarbon and fresh or regenerated catalyst is supplied. This pipe terminates within the reactor in the form of a nozzle or funnel-shaped exhaust 18a by which the mixture is distributed into the catalyst mass maintained in the vessel. Into the top of each reactor is connected a vapor discharge pipe 19. The reactor shown in Fig. 1 has an auxiliary drawoff 20 controlled by valves 21 and provision is made for supplying steam to an elongated leg of the reactor through a manifolded pipe 22. The catalyst withdrawal pipes 15 from the stripper and pipe 20 from the reactor communicate with a transfer pipe 23 through which the spent catalyst is passed with air to the regenerator not shown. On top of the stripper head is mounted a turbine and suitable reduction gearing diagrammatically shown at 24 which drives shaft 25 mounted centrally in the center of the stripper.

Since the interior construction of the stripper, detailed in Fig. 4, is the same as that indicated in the broken away portion of the reactor 13 in Fig. 3 a single description will suffice. At intervals within the stripper and along its vertical height are positioned a plurality of open-ended flow tubes 26. These flow tubes are preferably supported upon straightening vanes 27 located below the flow tubes and shown in Figs. 4 and 6. Within the flow tubes and mounted upon and rotating with shaft 25 are impellers 28. Affixed to the inside surface or shell of the vessel between the flow tubes are baffle rings 29. These rings serve as baffles between the circulating stages, supporting the straightening vanes and circulating tubes, and have concave or sloping surfaces which direct the flow of the catalyst and reactants from the annular space surrounding the circulating tubes back into the circulating tubes or into the adjoining circulating stage below.

Above the circulating tubes and the catalyst level indicated at 30 and supported from the top of the shell is a depending open-ended skimming cylinder 31. The transverse plate 32 which closes the top of the skimming cylinder has a central hole 33 therein somewhat larger than the diameter of the shaft 25 providing a vapor outlet port for the gaseous material after separation from the catalyst. About the periphery of the skimming cylinder at regular intervals are a plurality of louvers 34, indicated in Figs. 3, 4 and 5. Mounted upon and rotating with shaft 25 within the skimming cylinder is a wheel equipped with radial blades 35. These blades may be in the form of elongated plates substantially the length from top to bottom of the skimming cylinder 31. If desired they may be arched radially to increase their effectiveness in separating the catalyst particles from the reactant vapors and projecting them outwardly through the louvers of the skimming cylinder. In the bottom of the stripper is provided an angular baffle 36 which serves to distribute and direct the steam introduced through pipe 14 into the center of the stripper and prevent accumulation of catalyst around the steam injection pipe. The bottom of the reactor shown in Fig. 3 is equipped with a double pipe arrangement 37 through which the hydrocarbon vapors are supplied to the reaction zone. In both the stripper and reactor a labyrinth seal not shown is provided through which steam or vapor is introduced and the lower bearing and packing protected from the pulverized catalyst particles. Catalyst is supplied to the reactor 13 in Fig. 3 through a diagonal pipe 38.

In operation spent catalyst is supplied to the stripper 10 from the reactor through pipe 16 where it is introduced at or immediately below the catalyst level 30. Steam or gas is introduced into the bottom of the stripper at a desired stripping temperature through pipe 14. Shaft 25 driven from turbine 24 is rotated at a proper velocity to cause impellers 28 to flow the catalyst upwardly through the interior of flow tubes 26. It will be noted that straightening vanes are positioned beneath the impellers and are omitted above the uppermost impeller in each stage. This enables the rotation imparted to the masses of catalyst within each flow tube to be utilized in effecting a centrifugal separation of the solids from the gases, directing the catalyst into the annular space for return to the same impeller while permitting a major portion of the gases to rise into the next stage above. Thus, there is a movement within each stage of the stripper of gases and catalyst upwardly through the flow tube and downwardly in the annular space between the flow tube and the shell of the stripper. The catalyst withdrawn from the bottom of the stripper through pipe 15 and that introduced from the reactor through pipe 16 are proportioned to maintain a catalyst level at 30 and cause gradual downward movement within the catalyst mass from top to bottom while local cyclic eddies are maintained within the separate flow tube stages.

Above the catalyst level reacted hydrocarbons in gaseous form pass off into the skimming cylinder where they are picked up by the blades 35 of the rotating wheel and solid suspended particles projected against the inner surface of the skimming cylinder. The force or energy given the particles by the wheel causes them to pass through the ports in the skimming cylinder behind the louvers and into the annular space between the skimming cylinder and stripper shell. In this annular space which is closed at the top there is established by the pumping action of the wheel a downflowing current which carries solid particles back into the catalyst body. Within the whirling mass of gaseous material, rotated by the wheel within the skimming cylinder, the quantity or percentage of catalyst particles decreases from bottom to top, that is, a greater part of the separated particles are projected through the louvers in the lower part of the skimming cylinder while in the upper part the gaseous reactants are relatively free of solid particles so upon discharge of the gaseous material through port 33 few, if any, particles are contained in the steam and hydrocarbon vapors stripped from the catalyst. The hydrocarbon vapor and steam from which the catalyst has been separated passes out through pipe 11 and is reintroduced to the reactor where it combines with the vapors therein and passes off to the fractionator through pipe 19.

The operation, when the principle is applied to a reactor as in Fig. 3, is the same except instead of introducing steam into the bottom of the vessel hydrocarbon vapor is introduced and counterflowed with the catalyst charged through pipe 38.

When the construction is incorporated into a regenerator air is introduced into the bottom of the vessel and the spent catalyst into the central portion at a location corresponding to pipe 38 of the reactor.

The advantages of the method will be readily appreciated from the foregoing description. The catalyst, whether it be spent catalyst introduced to a stripper, catalyst supplied to a reactor or spent catalyst introduced to a regenerator, is maintained at a constant level in the vessel by supply the catalyst at a rate equal to the rate at which catalyst is withdrawn. The stripping medium, reactants to be converted or combustion gas is supplied at the bottom and moves generally countercurrent to the movement of the catalyst mass. Within the separate flow tubes there is set up by the impellers local cyclic eddies which churn and circulate the gas-catalyst mixture in a manner that assures a more uniform mixture and intimate contact between the gases and solid particles than has been possible heretofore.

By interposing this stripping operation between the reactor and regenerator the hydrocarbons entrained within the catalyst structure or adsorbed on the catalyst surface are removed augmenting the yield and reducing combustible components objectionable in subsequent regenerating operations.

While the method and apparatus have been described in the treatment of hydrocarbon gases with a pulverized catalyst it is contemplated as well to use the apparatus and method wherever their application is feasible and effective in the treatment of gaseous materials with finely divided solids.

Thus, it will be seen that the objects have been accomplished and that the invention is one well adapted to attain the ends and accomplish the results hereinabove set forth together with other advantages which are obvious and which are inherent to the process and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A method of contacting gaseous materials with pulverized solids in a contacting zone which comprises passing the mixture of gases and solids upwardly in a stream located centrally of said zone, said solids entrained in the upwardly flowing gases, cascading the solids outwardly and reversing their flow while separating the gases therefrom, said solids caused thence to pass in an annular stream surrounding the upflowing stream, passing solids from the bottom of the annular stream to the bottom of the central upflowing stream and from the annular stream to the central stream at intervals intermediate the top and bottom of said streams and maintaining a level of solids in the contacting zone immediately above the top of the central and annular streams.

2. A method as in claim 1 including the step of subjecting the gases above the solids level to centrifugal separation to remove entrained and suspended solids therefrom.

3. A method as in claim 1 wherein a level of solids is maintained at the top of the contacting zone, said zone being in open communication with a zone of centrifugal separation the gases and entrained solids are passed upwardly in a centrally located stream, mechanically imparting high rotative velocity to the stream and projecting solid particles with a portion of the gases into the annular downflowing stream surrounding the central stream, returning the solids to the catalyst mass in the contacting zone and withdrawing gases from the top of the separating zone.

4. An apparatus for contacting gaseous materials with pulverized solids comprising an upright vessel having separate vapor and solids inlet and outlet connections, a plurality of open ended circulating tubes of smaller diameter than the vessel and concentric therewith, said tubes vertically spaced within the vessel below the solids delivery inlet, unobstructed vertical passageways internally and externally of said tubes and transverse passageways above and below said tube ends, a rotatable shaft centrally of the vessel, impellers on the shaft within the respective circulating tubes and means for driving the shaft.

5. An apparatus as in claim 4 including annular and radial baffles intermediate the circulating tubes.

6. An apparatus for contacting gaseous material with pulverized solids and separating the materials after contact comprising an apparatus as in claim 4, with an apertured skimming tube or cylinder concentric with the upright vessel and located within the vessel above the solids inlet connection, a rotatable shaft in the skimming cylinder, radially disposed vanes on said shaft and a gas discharge port in the top of the skimming cylinder communicating with the vapor outlet connection of the vessel.

7. An apparatus for contacting gaseous materials with pulverized solids and separating the materials after contact comprising an apparatus as in claim 4, with an apertured skimming tube or cylinder concentric with the upright vessel and located within the vessel above the solids inlet connection, a rotatable shaft in the skimming cylinder, radially disposed vanes on said shaft, a top closure for the annular space between the skimming cylinder and vessel and a gas discharge port in the top of the skimming cylinder communicating with the vapor outlet connection of the vessel.

DAVID H. PUTNEY.

REFERENCES CITED

The following references are of record in the file of this patent:

UNITED STATES PATENTS

| Number | Name | Date |
|---|---|---|
| 2,031,939 | Donlan | Feb. 25, 1936 |
| 2,308,751 | Guthrie et al. | Jan. 19, 1943 |
| 2,367,281 | Johnson | Jan. 16, 1945 |

FOREIGN PATENTS

| Number | Country | Date |
|---|---|---|
| 446,469 | Germany | July 2, 1927 |
| 330,163 | Great Britain | June 5, 1930 |
| 391,800 | Great Britain | May 3, 1933 |
| 541,734 | Great Britain | Dec. 9, 1941 |